Patented Aug. 21, 1945

2,383,283

UNITED STATES PATENT OFFICE 2,383,283

STABILIZING PHENOLIC RESINS

Robert W. Auxier, Pittsburgh 21, and William C. Weltman, Wilkinsburg, Pa., assignors to Westinghouse Electric Corporation, East Pittsburgh, Pa., a corporation of Pennsylvania No Drawing. Application August 29, 1941, Serial No. 408,808

6 Claims. (Cl. 260—19)

This invention relates to the manufacture of synthetic resins, and more particularly to sheet stock carrying phenol-aldehyde type resins.

In the manufacture of modified phenol-aldehyde resins suitable for machining, punching and working to shape by means of tools after molding to the infusible or C stage, the modified phenolic resin when applied to sheet or other fibrous material in the B stage will age rapidly and cannot be stored for any prolonged period of time, not even for one week. This rapid ageing of the modified phenolic resins not only results in waste, but also prevents the accumulation of treated material containing the resin in the B stage for subsequent manufacturing operations. In the case of breakdown of the treating apparatus, the entire manufacturing operations are subject to stoppage if the resin impregnating apparatus cannot be repaired within a day or two.

The object of this invention is to provide for a modified phenol-aldehyde type resin composition stabilized against ageing.

Another object of the invention is to provide for the addition of a stabilizer to oil modified phenol-aldehyde type resins to maintain their greenness.

Other objects of the invention will in part be obvious and will in part appear hereinafter in the specification and claims.

In producing phenol-aldehyde type resins which may be punched, machined and otherwise worked to predetermined shape without cracking or splintering the material under the tools employed, it has been found that oil modified phenol-aldehyde resins may be so worked without objectionable cracking, etc. In particular, tung-oil modified phenol-aldehyde resins have been used to impregnate fibrous material, such as kraft paper, cloth and the like, to produce composite material suitable for subsequent machining. In addition to tung oil, other oils having similar properties may be used—for example, oiticica oil and the like. The quantity of tung oil, or its equivalent, is generally based upon the phenol content of the resin, and is customarily added in quantities ranging from 10% of the phenol content, at which point its effect is appreciable, to as much as 100% of the phenol content. Furthermore, the resin may be plasticized by the addition of up to 40% of a plasticizer, such as diamyl phthalate, dibutyl phthalate or other plasticizer suitable for such use.

The tung oil, phenol and aldehyde are reacted together with a catalyst in a suitable reaction vessel for a predetermined length of time under suitable temperature conditions. At the end of the reaction, a solvent, for example, toluene or alcohol, is introduced into the reaction vessel to terminate the reaction and to put the resin into solution. The resin is readily removed from the vessel when in solution. The resin in the solution is in the A stage and is suitable for application to fibrous material, such as paper, duck and the like.

The oil modified resin solution may be applied to fibrous materials, for example, kraft paper, by dipping the paper in the solution and heat treating the impregnated paper for a length of time sufficient to evaporate the solvent and leave a predetermined quantity of resin in the paper. The resin at this phase of the process is in the B stage.

The B stage oil modified resin present in the paper is characterized by its rapid ageing and lack of adequate storage qualities. For example, paper impregnated with B stage resin having a greenness of 10% when tested immediately after impregnation had a greenness of 2% twenty-four hours later, and at the end of seven days, had no appreciable greenness. Greenness is the characteristic of resin flow under selected conditions of temperature and pressure. The customary test consists of compressing an impregnated sheet of material at 1000 pounds per square inch at 175° C., and measuring the amount of resin which exudes out of the impregnated material. Accordingly, 10% greenness denotes that a quantity of resin equal to 10% of the total weight of the impregnated sheet has softened and flowed out of the fibrous material under the temperature and pressure indicated. Since it is necessary that the material soften and exude somewhat when subjected to pressure and temperature, in order that a plurality of laminations of paper be bondable into a unitary consolidated structure, it will be appreciated that the greenness must be relatively high in order to produce well bonded composite members.

It may be stated that for all practical purposes, a greenness of not less than ½ of 1% is the minimum which may be present in a material suitable for producing laminated articles. Frequently, the greenness must be even higher for practical purposes. For example, in producing a laminated member from a plurality of sheets of impregnated paper, the amount of resin in the paper being in the ratio of 1.4, that is, the quantity of resin added equaling 40% of the weight of the unimpregnated paper, the minimum greenness should be 1% or over. In molding tubes from 1.4 resin ratio paper, a greenness of 5% is desirable. As the proportion of resin in the paper becomes higher, the minimum greenness may be slightly less, but, in any event, for flat plates, the minimum is ½ of 1% for greenness while for tubes 3% is considered the lowest feasible value. Accordingly, it will be seen that due to the decrease of greenness to 2% at the end of the first twenty-four hours after impregnation renders it imperative that fibrous material impregnated with oil modified phenolic resin be used promptly, preferably within the first day. This imposes unusual restrictions on the manufacturing process and hampers continuity of economical production. The lack of storability is also undesirable, since it is impossible to anticipate future orders for material of this type.

According to this invention, it has been found that nitrogenous organic compounds, which are substantially non-catalysts for phenol-aldehyde resins, exert a stabilizing effect on the oil modified phenol-aldehyde resins. By adding these nitrogenous organic compounds to the oil modified resin, preferably during the reaction phase of the process, though they may be introduced at later stages of the process, as to the solution, fibrous material impregnated with the resin in the B stage, including the nitrogenous compounds, may be stored for prolonged periods of time without detrimental changes in greenness.

In particular, it has been found that organic compounds in which nitrogen is introduced in the molecule in such a position that the nitrogen compound does not act appreciably as a catalyzing amine may be used as a stabilizer or ageing inhibitor in oil modified resins. Examples of such compounds are pyridine homologues, for example, picoline, which compounds exert a pronounced stabilizing effect on the resin. Piperidine due to its strong catalytic effect was found to be unsuitable. Lecithin has been found to produce a stabilized resin which retains its greenness over prolonged periods of time. In addition, dicyandiamide has also been added to the oil modified phenol-aldehyde resins with satisfactory storage characteristics in the resin when in the B stage.

It has been found that the stabilizing nitrogenous compounds are effective when added in small quantities, for example, additions of from .1% to 2% of stabilizer will inhibit the ageing effect. The following example is illustrative of employing the invention. Within a reaction vessel are placed 100 parts of cresylic acid, 35 parts of tung oil, 71 parts of 40% formaldehyde solution, 1 part picoline, and a catalyst, for example, 0.05 to 0.2 part of calcium hydroxide. The mixture is reacted for several hours at a temperature of approximately 100° C. Thereafter, a vacuum line is connected to the reaction vessel to withdraw water as present in the ingredients and as generated by the reaction. The temperature may be elevated at this stage of the process to cause the reaction to proceed to completion. The reaction may be terminated by introducing a large volume of toluene, ethyl alcohol, or other resin solvent. The solvent is stirred with the resin, and the resin varnish solution is produced. The resin varnish solution is in the A stage, and is suitable for application to fibrous materials of all types. If desired, a plasticizer may be added to the phenolic resin during the reaction or after the resin is in solution.

The results from the addition of 1% of picoline were:

| | Percent |
|---|---|
| Original greenness | 13.1 |
| After 1 week | 11.0 |
| After 2 weeks | 10.0 |
| After 3 weeks | 9.4 |
| After 4 weeks | 9.5 |
| After 5 weeks | 9.1 |
| After 6 weeks | 8.9 |
| After 7 weeks | 7.6 |
| After 8 weeks | 8.0 |
| After 9 weeks | 8.4 |

Fibrous material with resin of this degree of greenness is suitable for practically all types of laminated material. For example, a plurality of layers of kraft paper impregnated with the resin may be superimposed to a desired thickness, and upon subjecting the stack to a pressure of 1000 pounds per square inch and 175° C. temperature, the resin will flow sufficiently to thoroughly saturate the layers of paper, and thereafter the resin will assume the infusible or C stage. The entire stack of paper will be well bonded into a composite article suitable for punching, drilling and other machining operations. The composite member will not crumble or shatter regardless of the number of holes punched therein. This material is a very desirable product for many manufacturing operations.

In a second case, 0.4% of lecithin was added to a resin, and the resin employed to impregnate kraft paper. The original greenness of the paper was 11.0%,

| | Per cent |
|---|---|
| After seven days | 9.4 |
| After fourteen days | 8.1 |
| After twenty-one days | 6.3 |
| After thirty days | 6.4 |

In further tests, dicyandiamide was added to an oil modified cresylic acid condensate. Various quantities of the stabilizer and the greenness with time are given in the following table:

| | Percent dicyandiamide (on basis of cresylic acid) | | |
|---|---|---|---|
| | 0.3 | 0.6 | 1.15 |
| Original greenness | 25.5 | 18.6 | 7.5 |
| 1 week | 22.0 | 20.0 | 10.0 |
| 2 weeks | 20.9 | 20.4 | 10.9 |
| 3 weeks | 20.6 | 18.9 | 9.9 |
| 4 weeks | 17.8 | 16.75 | 9.2 |
| 5 weeks | 18.5 | 18.1 | 11.85 |
| 6 weeks | 18.2 | 17.2 | 12.6 |
| 7 weeks | 17.4 | 17.3 | 11.6 |
| 8 weeks | 19.2 | 17.5 | 8.7 |
| 9 weeks | 17.0 | 17.0 | 7.9 |
| 10 weeks | 17.7 | 17.8 | 10.6 |
| 11 weeks | 14.7 | 16.8 | 11.7 |
| 12 weeks | 18.2 | 17.2 | 13.1 |
| 13 weeks | 19.4 | 18.5 | 13.1 |
| 14 weeks | 18.9 | 20.1 | 12.0 |
| 15 weeks | 18.8 | 19.8 | 14.0 |

As a further example, another grade of lecithin produced from soy beans, sold under the trade name of Yelkin TT, containing approximately 0.9% of nitrogen, was employed with the results given in the table below:

| | Percent Yelkin TT (on basis cresylic acid) | | | |
|---|---|---|---|---|
| | 1.0 | 0.85 | 0.70 | 0.50 |
| Original greenness | 23.0 | 10.9 | 13.9 | 20.3 |
| 1 week | 24.1 | 7.15 | 17.0 | 22.3 |
| 2 weeks | 23.05 | 12.6 | 16.4 | 21.8 |
| 3 weeks | 20.5 | 10.5 | 14.15 | 19.8 |
| 4 weeks | | 10.25 | 15.2 | 19.2 |
| 5 weeks | 19.6 | 9.75 | 13.6 | 20.1 |
| 6 weeks | | 9.6 | 12.1 | 19.8 |
| 7 weeks | 18.4 | 8.9 | 11.3 | 18.3 |
| 8 weeks | 19.3 | 6.9 | 8.8 | 16.8 |
| 9 weeks | 18.4 | 5.7 | 8.75 | 15.3 |
| 10 weeks | 15.25 | 4.3 | 9.1 | 12.6 |

It will be appreciated that by means of the invention herein disclosed it is possible to prepare a varnish containing the highly useful oil modified phenolic resin and impregnated fibrous material therewith preparatory to consolidation of the fibrous material under pressure. The fibrous material may be stored for long periods of time without undesirable reduction in greenness of the material. In the event of breakdown of apparatus, the stored material will assure continuity of subsequent operations and, in addition, the more economical functioning of the manufacturing process will be secured. Less wastage of the prepared material with B stage resin will occur.

It should be emphasized that the inhibitor action is not that of an anti-oxidant. Numerous tests with anti-oxidants of different types have resulted in a failure of the resin to properly flow and consolidate sheets in the molding operation after a few days storage. Numerous other compounds have been tried, and it is believed that the presence of nitrogen in an organic compound, the nitrogen being such that catalysis does not occur, is necessary for the proper ageing retardant functioning of the stabilizer.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. A stabilized resinous composition comprising, in combination, the potentially thermosettable product of the substantially simultaneous reaction of a phenol, aldehyde and an oil selected from the group consisting of tung oil and oiticica oil, the amount of oil being from about 10% to 100% of the weight of the phenol, and a minor proportion of the weight of the reaction product of a nitrogenous organic compound incapable of materially catalyzing the simultaneous reaction, the nitrogenous organic compound selected from the group consisting of pyridine homologues, lecithin and dicyandiamide, the nitrogenous organic compound providing for good greenness for a storage period of the order of one month in a base material impregnated with the stabilized resinous composition.

2. A stabilized resinous composition comprising, in combination, the potentially thermosettable product of the substantially simultaneous reaction of a phenol, aldehyde and an oil selected from the group consisting of tung oil and oiticica oil, the amount of oil being from about 10% to 100% of the weight of the phenol, and from about 0.1% to 2% by weight based on the phenol content of a nitrogenous organic compound incapable of materially catalyzing the simultaneous reaction, the nitrogenous organic compound selected from the group consisting of pyridine homologues, lecithin and dicyandiamide, the nitrogenous organic compound providing for good greenness for a storage period of the order of one month in a base material impregnated with the stabilized resinous composition.

3. A resinous composition stabilized against ageing comprising, in combination, the product of the substantially simultaneous reaction of cresylic acid, formaldehyde and an oil selected from the group consisting of tung oil and oiticica oil, the amount of oil being from about 10% to 100% of the weight of the cresylic acid, the reaction product being partially reacted and capable of thermosetting into the infusible state, and a minor proportion based on the weight of the reaction product of a nitrogenous organic compound incapable of catalyzing the reaction, the nitrogenous organic compound selected from the group consisting of pyridine homologues, lecithin and dicyandiamide.

4. A resinous composition stabilized against ageing comprising, in combination, the product of the substantially simultaneous reaction of cresylic acid, formaldehyde and an oil selected from the group consisting of tung oil and oiticica oil, the amount of oil being about 10% to 100% of the weight of the cresylic acid, the reaction product being partially reacted and capable of thermosetting into the infusible state, and from about 0.1% to 2% based on the weight of the cresylic acid of a nitrogenous organic compound incapable of catalyzing the reaction, the nitrogenous organic compound, selected from the group consisting of pyridine homologues, lecithin and dicyandiamide.

5. An article of manufacture comprising, in combination, a base material and a resinous material applied to the base material, the resinous material being potentially reactive under heat to a thermoset state, the resinous material composed of the product of the substantially simultaneous reaction of a phenol, an aldehyde and an oil selected from the class consisting of tung oil and oiticica oil, the amount of oil being from about 10% to 100% of the weight of the phenol, and a small but effective amount of a stabilizing nitrogenous organic compound incapable of materially catalyzing the reaction present in the resinous material, the nitrogenous organic compound selected from the group consisting of pyridine homologues, lecithin and dicyandiamide, the nitrogenous organic compound providing for the maintenance of a satisfactory greenness of the resinous material for periods of the order of one month whereby the base material may be molded under heat and pressure.

6. An article of manufacture comprising, in combination, a base material and a resinous material applied to the base material, the resinous material being potentially reactive under heat to a thermoset state, the resinous material composed of the product of the substantially simultaneous reaction of a phenol, an aldehyde and an oil selected from the class consisting of tung oil and oiticica oil, the amount of oil being from about 10% to 100% of the weight of the phenol, and from about 0.1% to 2% of a stabilizing nitrogenous organic compound incapable of materially catalyzing the reaction present in the resinous material, the nitrogenous organic compound selected from the group consisting of pyridine homologues, lecithin and dicyandiamide, the nitrogenous organic compound providing for the maintenance of a satisfactory greenness of the resinous material for periods of the order of one month whereby the base material may be molded under heat and pressure.

ROBERT W. AUXIER.
WILLIAM C. WELTMAN.